(12) United States Patent
Chapalain et al.

(10) Patent No.: US 8,563,126 B2
(45) Date of Patent: Oct. 22, 2013

(54) FILM FOR PACKAGING PRODUCT, ESPECIALLY AN ENVELOPE

(75) Inventors: Florian Chapalain, Dax (FR); David Martinez, Tarnos (FR)

(73) Assignee: Gascogne Laminates, Dax (FR)

( * ) Notice: Subject to any disclaimer, the term of this patent is extended or adjusted under 35 U.S.C. 154(b) by 0 days.

(21) Appl. No.: 13/363,465

(22) Filed: Feb. 1, 2012

(65) Prior Publication Data

US 2012/0193402 A1    Aug. 2, 2012

Related U.S. Application Data

(60) Provisional application No. 61/438,695, filed on Feb. 2, 2011.

(30) Foreign Application Priority Data

Feb. 1, 2011    (FR) ...................... 11 50748

(51) Int. Cl.
*B32B 3/00*    (2006.01)
(52) U.S. Cl.
USPC ...................... 428/314.4; 428/35.2
(58) Field of Classification Search
USPC .............................. 428/35.2, 314.4
See application file for complete search history.

(56) References Cited

U.S. PATENT DOCUMENTS

| 3,271,228 | A | * | 9/1966 | Ives | 428/343 |
| 5,028,480 | A | * | 7/1991 | Dean | 428/314.4 |
| 5,431,989 | A | * | 7/1995 | Beltzung et al. | 428/218 |
| 2010/0266824 | A1 | * | 10/2010 | Westwood et al. | 428/212 |
| 2012/0193402 | A1 | * | 8/2012 | Chapalain et al. | 229/68.1 |

FOREIGN PATENT DOCUMENTS

| EP | 0372363 A2 | 6/1990 |
| FR | 2901250 A1 | 11/2007 |
| JP | 2005168637 | * 6/2005 |
| WO | 2008/020959 A2 | 2/2008 |

OTHER PUBLICATIONS

French Search Report, dated Jun. 10, 2011, in FR 1150748.

* cited by examiner

*Primary Examiner* — N. Edwards
(74) *Attorney, Agent, or Firm* — Young & Thompson

(57) ABSTRACT

The invention relates to a film 2 including at least one print layer 3 and a non-woven layer 4 having a density of less than 0.5 g/cm³. The invention also relates to a packaging product, especially an envelope, including such a film, and to a method for obtaining an above-described film, in which the film 2 is obtained by assembling, for example by extrusion-laminating or by laminating, a print layer and a non-woven layer.

22 Claims, 1 Drawing Sheet

FILM FOR PACKAGING PRODUCT, ESPECIALLY AN ENVELOPE

The present invention relates to films for packaging products, especially envelopes, and more particularly shock-absorbing and resistant envelopes for the conveying of heavy and fragile articles.

In shock-absorbing and resistant envelopes for mailings, there are two categories that are distinguished: untearable envelopes, for sending heavy documents, and shock-absorbing envelopes, for sending fragile articles.

For the untearable envelopes, the materials conventionally used are, in particular, reinforced kraft paper, triplex film paper, and the material with the brand name Tyvek. Reinforced kraft paper is obtained by assembling one or two paper layers with a reinforcing means between the two layers, in the form of a grid made of polyethylene, polypropylene, polyester, glass or viscose (cellulose), by means of extrusion-lamination. The reinforced kraft paper is highly resistant to tearing but is relatively heavy and does not allow easy and proper printing, owing to the relief created by the reinforcing means, thereby limiting its use as a medium for advertising. Triplex film paper is obtained by assembling, laminating or extrusion-laminating two paper layers with, between the two, a reinforcing means in the form of a polypropylene film. The resulting triplex film paper may have a grammage of 100 to 150 g/m$^2$, is easy to print and is mechanically strong. However, any defect in the form of a fissure or any projecting angle in the plastic film may give rise to tear propagation. Moreover, since the user is unable to see the reinforcing means, said user tends to regard the triplex film paper as being no more resistant than a traditional paper envelope. Lastly, the material with brand name Tyvek takes the form of sheets and is composed of thermally bonded synthetic fibers (HDPE). Tyvek is light (41 to 68 g/m$^2$), highly mechanically strong and easy to print. However, envelopes manufactured from Tyvek are more difficult to obtain with the conventional converting devices, and have a high cost.

For the shock-absorbing envelopes, there are presently two solutions: foams/bubbles, and cellulosic complexes. The bubbles/foams are obtained by thermal reactivation of polyethylene-coated paper having two polyethylene films separated by layers of air in the form of discontinuous alveoli (bubbles) or having a continuous mat of expanded polyethylene (foam). These materials are shock-absorbing, but have a number of drawbacks: they are thick (1000 to 4000 μm), have poor mechanical properties, and are difficult to print subsequently, owing to the relief created by the bubbles. Moreover, the manufacture of envelopes of this kind involves specific machinery. The cellulosic complexes, as for example that known under the brand name Sumo, are obtained by assembling two paper layers padded with recycled paper in various forms (glued paper sheets, cut paper strips or ground papers). These materials exhibit effective shock absorption, but are also heavy (greater than 300 g/m$^2$), thick (up to 5000 μm), difficult to print, sensitive to water/moisture, and of low mechanical strength.

One aim of the present invention is therefore to provide a film for a packaging product, especially for an envelope, that solves the technical problems set out above. More particularly, one aim of the invention is to provide a film which makes it possible at one and the same time to protect articles from impacts or scratches, and to have high mechanical strength and high impermeability, and also to be easy to print, in order to allow the mailing of articles which are both heavy and fragile. Another aim of the invention is to provide an envelope film which can be manufactured on conventional machinery, as for example on machinery for reinforced kraft.

For this purpose, in one embodiment, a film is proposed which comprises at least one print layer and a non-woven layer having a density of less than or equal to 0.5 g/cm$^3$, for example between 0.001 g/cm$^3$ and 0.5 g/cm$^3$.

A film is understood to be a sheet of flexible or rigid material which can be cut and/or folded in order to produce, for example, an envelope or a packaging product. The use of a particular non-woven layer on the one hand enables easy manufacture with conventional machinery, and on the other hand enables realization both of mechanical strength and of protection against impact and scratches. It is possible, accordingly, to use envelopes of this kind to mail heavy objects which are sensitive to scratches or to impacts. The non-woven layer is preferably random interentanglement of fibers assembled in various ways. The non-woven layer may be obtained by a dry method (for example by carding and needling), by a wet method or by a thermal method (for example by a melt method).

The non-woven layer has a density of less than or equal to 0.5 g/cm$^3$, for example of between 0.001 g/cm$^3$ and 0.5 g/cm$^3$, preferably less than or equal to 0.1 g/cm$^3$, for example of between 0.001 g/cm$^3$ and 0.1 g/cm$^3$, and more preferably of less than or equal to 0.05 g/cm$^3$, for example of between 0.001 g/cm$^3$ and 0.05 g/cm$^3$. The non-woven layer having a density as defined above provides both for impact absorption and for tear resistance.

The non-woven layer may have a grammage, measured in accordance with the ISO 536 standard, of between 40 and 150 g/m$^2$, preferably between 40 and 120 g/m$^2$, and more preferably still between 40 and 80 g/m$^2$.

The non-woven layer may also have a thickness, measured in accordance with the ISO 534 standard (thickness measured with a pressure of 100 kPa), of between 50 and 2000 μm, preferably between 100 and 500 μm. The non-woven layer may have a thickness, measured in accordance with the ISO 9073/2 standard (thickness measured with a pressure of 0.5 kPa), of between 1000 and 2500 μm, preferably between 1500 and 2000 μm.

Changing the grammage and/or thickness of the non-woven layer may make it possible to adapt the properties of the envelope, especially its weight, its shock absorption, its thickness, etc.

Therefore, relative to a conventional paper layer, the non-woven layer forms a shock-absorbing blanket by virtue of its low density and its high deformability, thereby making it possible to limit the transmission of impact between the outside of the envelope and the inside of the envelope in which the product is placed.

The non-woven layer may be separate from the print layer.

The non-woven layer may comprise a non-woven layer of polyethylene terephthalate. Polyethylene terephthalate non-woven provides the desired ease of manufacture while retaining the required mechanical properties.

The print layer may be a fiber layer, especially a cellulosic layer, or a plastic layer. The print layer makes it possible especially to provide a carrier for the non-woven layer and a printing surface for the film. Moreover, the print layer likewise provides the film with a stiffness which allows it to be manufactured.

The print layer may therefore comprise paper or card, preferably with a grammage, measured in accordance with the ISO 536 standard, of between 10 and 500 g/m$^2$, preferably between 10 and 300 g/m$^2$, and more preferably between 20 and 250 g/m$^2$. The paper may be white or brown paper, allowing easy printing, for example recycled paper.

The print layer may further comprise printing ink.

According to one embodiment, the film may be composed of a print layer optionally comprising printing ink, a non-woven layer having a density of less than or equal to 0.5 g/cm³, and optionally a glue layer between the print layer and the non-woven layer. The glue layer, or assembly layer, makes it possible to keep the print layer and the non-woven layer in contact together by lasting adhesion. The glue layer may also enhance the impermeability of the film. The glue layer may be, for example, an extrusion-laminated polyethylene layer.

Accordingly, according to a first embodiment, the film may be composed of a print layer and of a non-woven layer having a density of less than or equal to 0.5 g/cm³.

According to a second embodiment, the film may be composed of a print layer comprising printing ink and a non-woven layer having a density of less than or equal to 0.5 g/cm³.

According to a third embodiment, the film may be composed of a print layer, a non-woven layer having a density of less than or equal to 0.5 g/cm³, and a glue layer between the print layer and the non-woven layer.

According to a fourth embodiment, the film may be composed of a print layer comprising printing ink, a non-woven layer having a density of less than or equal to 0.5 g/cm³, and a glue layer between the print layer and the non-woven layer.

Advantageously, the non-woven layer is on the interior part of the film, and the print layer is on the exterior part of the film.

The non-woven layer may be attached to the print layer by lamination (for example glue-lamination) or by extrusion-lamination with, for example, a polyethylene layer.

According to another aspect, the invention also relates to a packaging product, especially an envelope, comprising an above-described film.

An envelope is understood to be a film which is folded in such a way that it can contain a letter, a card, an article, etc. The envelope may be composed of the above-described film.

According to another aspect, the invention also relates to a method for obtaining an above-described film, in which the film is obtained by assembling the print layer and the non-woven layer.

The assembly may be obtained by lamination, for example with wax, or by extrusion-lamination, for example with a polyethylene layer.

Other advantages and features will emerge from an examination of the detailed description of one particular embodiment, which is given by way of example, without any limitation, and is illustrated by the attached drawings, in which.

Figure 1:
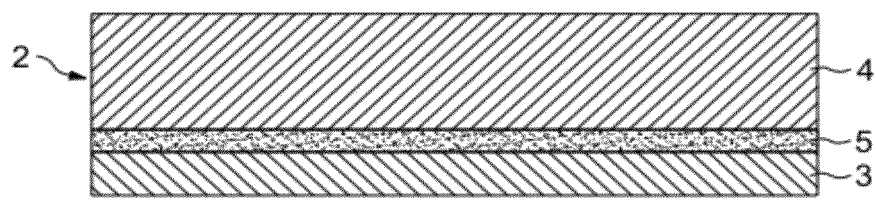
FIG. 1 represents schematically a film according to the invention.

FIG. 1 shows, very schematically, a section of an envelope 1 (see FIG. 2) in the form of a film 2. The film 2 comprises a print layer 3, for example of paper or of card, and a non-woven layer 4. The film 2 may further comprise a glue layer 5 between the print layer 3 and the non-woven layer 4.

The film 2 may comprise, or even be composed of, 2 plies or layers, with optionally a glue layer. The first layer, layer 3, may be a white paper layer, for example of recycled paper, or of card. The first layer, layer 3, may also be printed, over part or all of its outer face, with a printing ink. The first layer, layer 3, may have a grammage, measured in accordance with the ISO 536 standard, of between 10 and 500 g/mm², preferably between 20 and 250 g/m².

The second layer, layer 4, is a non-woven layer, for example of polyethylene terephthalate. The non-woven layer 4 is obtained for example by a dry method (for example by carding and needling), by a wet method or by a thermal method (for example, melting). The non-woven layer has a density of less than 0.5 g/cm³. The non-woven layer may also have a grammage of between 40 and 150 g/m², and may be attached to the inside surface of the print layer, by an adhesive polyethylene layer 5, for example. The non-woven layer 4 may have a thickness, measured in accordance with the ISO 9073/2 standard, of between 1000 and 2500 μm.

The non-woven layer 4 therefore allows the articles introduced into the envelope to be protected against scratches, and to be protected against impacts. The reason is that, by virtue of the thickness of the non-woven layer 4 and of its compressibility, it is able to deform under impacts, and thus to absorb part of those impacts. In contradistinction to a conventional paper layer, the non-woven layer 4 allows a weaker transmission of impacts on either side of its thickness.

Figure 2:
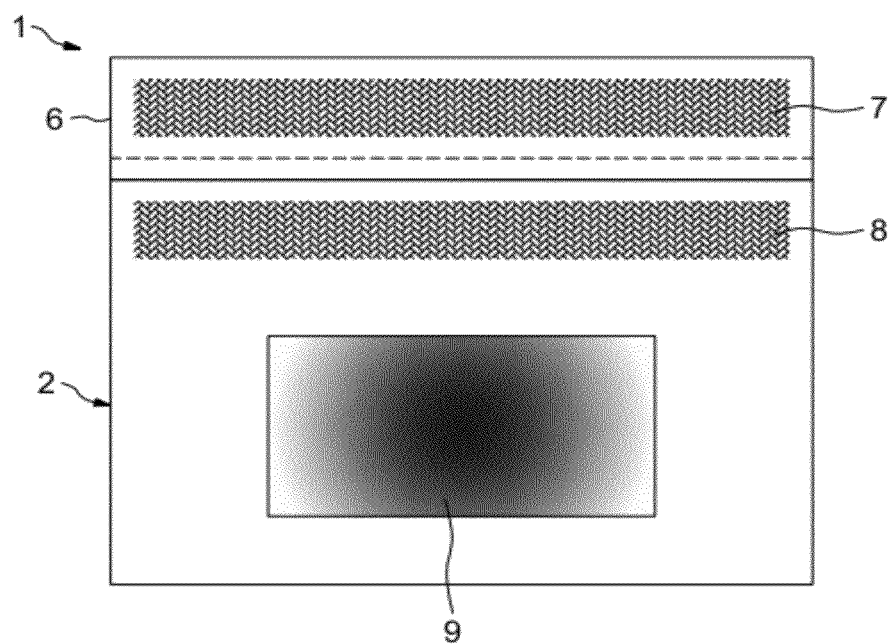
FIG. 2 represents schematically a shock-absorbing envelope according to the invention.

FIG. 2 shows an envelope 1 according to the invention. The envelope 1 comprises, or is even composed of, the film 2 described in FIG. 1. The envelope 1 may further comprise side flaps and a closing tab 6, when the opening is along the length of the envelope, or a bottom tab and a closing tab when the opening is across the width of the envelope. The side flaps and/or the tabs may be formed by the film 2. The envelope may further comprise gluing areas 7, 8 within the closing tab 6, allowing the envelope to be closed solidly and robustly when the article to be sent has been inserted into it. More particularly, the print layers 3 and non-woven layers 4 are selected so as to be compatible with the traditional glue layers used for the fabrication of envelopes, especially the glue layers used for fastening the base tabs and/or the closing tabs.

Lastly, the envelope 1 may further comprise a printing area 9, which may cover part or all of the surface of the print layer 3. This printing area 9 is particularly easy to produce by virtue of the uniform and relatively low thickness of the envelope 1, in contrast to the bubble envelopes, for example.

Furthermore, the envelope obtained in this way is of limited thickness and limited weight, suitable for mailings. Moreover, the envelope thus designed also makes it possible to conserve articles which are sensitive to moisture.

As examples, three compositions of films for shock-absorbing envelopes are given below.

EXAMPLE 1

The film according to the first example is composed of:
- a recycled, bleached paper layer having a grammage of 48 g/m²
- a polyethylene layer having a grammage of 15 g/m²
- a non-woven polyethylene terephthalate layer having a grammage of 60 g/m² and a thickness of 1850 μm in accordance with the ISO 9073/2 standard, obtained by carding and then needling.

The non-woven layer therefore has a density of approximately 0.032 g/cm³. The film of this example has in particular a total thickness (measured in accordance with the ISO 534 standard) of 350 μm, plus or minus 50 μm.

EXAMPLE 2

In a second example, the film is composed of:
- a bleached, pure wood-pulp paper layer having a grammage of 70 g/m²
- a polyethylene layer having a grammage of 15 g/m²
- a non-woven polyethylene terephthalate layer having a grammage of 60 g/m² and a thickness of 1850 μm in accordance with the ISO 9073/2 standard, obtained by carding and then needling.

The non-woven layer therefore has a density of approximately 0.032 g/cm$^3$. The film of this example has in particular a total thickness (measured in accordance with the ISO 534 standard) of 400 µm, plus or minus 50 µm.

EXAMPLE 3

In a third example, the film is composed of:
an unbleached kraft paper layer having a grammage of 50 g/m$^2$
a polyethylene layer having a grammage of 23 g/m$^2$
a polyethylene terephthalate grid having a grammage of 6 g/m$^2$, with square patterns with a side length of 0.8 cm
a non-woven polyethylene terephthalate layer having a grammage of 60 g/m$^2$ and a thickness of 1800 µm in accordance with the ISO 9073/2 standard, obtained by thermal bonding.

The non-woven layer therefore has a density of approximately 0.033 g/cm$^3$. The film of this example has in particular a total thickness (measured in accordance with the ISO 534 standard) of 360 µm, plus or minus 50 µm.

Accordingly, an envelope is obtained which exhibits a substantial gain in terms of volume and weight in relation to bubble envelopes, for example, while guaranteeing satisfactory protection from scratches and from impacts, and also a high level of tear resistance and bursting resistance. Furthermore, the non-woven layer also provides uniform protection within the envelope.

Alternatively, the film described above may also be used to form bags or any other packaging or packing product where there is a need for high breaking strength and for protection from impacts.

The invention claimed is:

1. Film (2) comprising:
at least one print layer (3);
a non-woven layer (4) having a density of less than or equal to 0.5 g/cm$^3$, the non-woven layer (4) having a grammage, measured in accordance with the ISO 536 standard, of between 40 and 150 g/m$^2$; and
a glue layer (5) between the one print layer (3) and the non-woven layer (4).

2. Film (2) according to claim 1, wherein the non-woven layer (4) is separate from the print layer (3).

3. Film (2) according to claim 1, wherein the non-woven layer (4) has a density of less than or equal to 0.1 g/cm$^3$.

4. Film (2) according to claim 1, wherein the grammage of the non-woven layer (4), measured in accordance with the ISO 536 standard, is between 40 and 80 g/m$^2$.

5. Film (2) according to claim 1, wherein the non-woven layer (4) is obtained by a dry method, by a wet method or by a thermal method.

6. Film (2), according to claim 1, wherein the non-woven layer (4) has a thickness, measured in accordance with the ISO 9073/2 standard, of between 1000 and 2500 µm.

7. Film (2) according to claim 1, wherein the print layer (3) further comprises printing ink.

8. Film (2) comprising:
a print layer (3) comprising printing ink;
a non-woven layer (4) having a density of less than or equal to 0.5 g/cm$^3$; and
a glue layer (5) between the print layer and the non-woven layer, the glue layer being a polyethylene layer.

9. Packaging product, comprising a film according to claim 1.

10. Film (2) according to claim 1, wherein the non-woven layer (4) has a density of equal to 0.05 g/cm$^3$.

11. An envelope (1), comprising a film according to claim 1.

12. Film (2) comprising:
at least one print layer (3); and
a non-woven layer (4) having a density of less than or equal to 0.5 g/cm$^3$, the non-woven layer (4) having a grammage, measured in accordance with the ISO 536 standard, of between 40 and 150 g/m$^2$,
wherein the one print layer (3) is attached to the non-woven layer (4).

13. Film (2) according to claim 12, wherein the non-woven layer (4) is separate from the print layer (3).

14. Film (2) according to claim 12, wherein the non-woven layer (4) has a density of less than or equal to 0.1 g/cm$^3$.

15. Film (2) according to claim 12, wherein the grammage of the non-woven layer (4), measured in accordance with the ISO 536 standard, is between 40 and 80 g/m$^2$.

16. Film (2) according to claim 12, wherein the non-woven layer (4) is obtained by a dry method, by a wet method or by a thermal method.

17. Film (2), according to claim 12 wherein the non-woven layer (4) has a thickness, measured in accordance with the ISO 9073/2 standard, of between 1000 and 2500 µm.

18. Film (2) according to claim 1, wherein the print layer (3) further comprises printing ink.

19. Film (2) according to claim 1, wherein, an adhesion layer (5), located between the print layer and the non-woven layer, attaches the one print layer to the non-woven layer.

20. Packaging product, comprising a film according to claim 12.

21. An envelope (1), comprising a film according to claim 12.

22. Film (2) according to claim 12, wherein the non-woven layer (4) has a density equal to 0.5 g/cm$^3$.

* * * * *